3,248,457
UNSATURATED ARYLENE PHOSPHONIUM MONOMERS

Gaetano F. D'Alelio, South Bend, Ind., assignor, by direct and mesne assignments, to Dal Mon Research Co., Cleveland, Ohio, a corporation of Delaware
No Drawing. Filed Aug. 7, 1962, Ser. No. 215,279
8 Claims. (Cl. 260—932)

This invention is concerned with a new class of monomers and polymers. Generally, it refers to a class of monomers which, on polymerization, produce insoluble polymers. More specifically, it refers to monomers having at least two methylene phosphonium moieties attached directly to an aryl nucleus. These monomers are represented by the formula $$Ar(CH_2\underset{Z}{\overset{\overset{O}{\|}}{P}}-OR')_n$$

wherein $n$ represents a numerical value of 2 to 4; Z represents a radical selected from the class of OR, OM, and $NR_2$, wherein M is a radical selected from the class of ammonium, amines, and monovalent and polyvalent metals; R' is a hydrocarbon radical containing from 2 to 12 carbon atoms, and having terminal aliphatic unsaturation therein, i.e. $CH_2=C<$, including $CH_2=CH$; R is selected from the class consisting of hydrocarbon radicals containing 1 to 20 carbon atoms, including those defined for R'; and Ar represents an aromatic nucleus as defined below.

The aromatic nucleus Ar has the structure

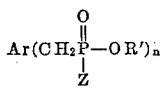

and may comprise one such ring, as in benzene, or a fused ring system, as in naphthalene, or on joined rings, such as diphenyl, terphenyl, diphenylethane, stilbene, etc., and to this ring is attached at least two

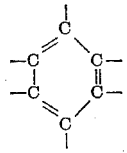

groups. The residual valencies of Ar are occupied by hydrogen or by monovalent and polyvalent groups, Y, which are selected from the class of —R, —OR, —$NR_2$ and the acyloxy, alkoxy, aryloxy, cycloalkoxy, carbalkoxy derivatives of the R group, alkylene, arylene, alkarylene, aralkylene, oxygen, sulfur, and

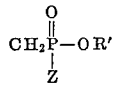

groups. The aromatic nucleus, including the derivative groups therein, preferably has no more than 30 carbon atoms therein. A few such monovalent and polyvalent groups are H, —$C_2H_5$, —$C_3H_7$, —$CH_3$, —$OC_4H_9$, —$OC_5H_{11}$, —$N(CH_3)_2$, $CH_3COOCH_2CH_2$— $C_6H_{11}OC_6H_4$—, $C_6H_5CH_2OOCC_6H_4$—, $CH_3$— $CH_3(CH_2)_n$— wherein $n$ is 1 to 8, —$C_6H_4$—, $C_6H_4C_6H_4$—, —$C_6H_4CH_2$—, —$CH_2C_6H_4CH_2$—, $(OCH_3)_2$
|
—$CH_2C_6H_2CH_2$—, $C_6H_4OC_6H_4$—
—O—, —NH—, —$NHC_6H_4$—,

—$C_6H_4NC_6H_4$—, —N—
| |
$CH_3$   $C_6H_5$ etc. The second or additional valencies of the Y group can be attached to other groups of the type indicated or to the phosphonium moiety.

The nature of the Y group is not extremely critical for the purpose of this invention, providing, of course, at least two

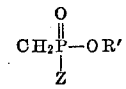

groups are attached to the aryl nucleus.

A number of unsaturated phosphonium esters have been known for some time, and while some of them have been shown to polymerize to hard glassy solids, it has not been true of many of this broad class of compounds, since many or most of them polymerize to art-gum like materials or soft gels, while some of them become viscous fluids (J. Am. Chem. Soc., 76, 2191 (1954)). It has now been discovered that these disadvantages can be overcome by the class of compounds of this invention because of the two or more

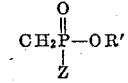

groups attached to the aromatic nucleus in the monomer, especially in cases where —Z is OR', so that at least two

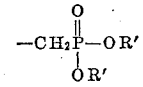

groups are attached to the aromatic nucleus, insoluble, infusible polymers are easily and most readily obtained. The terms "polymers" and "polymerizations" as used herein are intended to include "copolymers" and "copolymerizations."

The following examples illustrate the synthesis of the compounds of this invention, by the reaction of $$Ar(CH_2X)_n$$

wherein X is a halogen such as Br, Cl, or I, with a phosphite ester, $P(OR)_3$, wherein at least one R group attached to the oxygen atom is an unsaturated radical containing 2 to 12 carbon atoms, such as —$CH_2CH=CH_2$, —CH—CH=$CH_2$,  —$CH_2C=CH_2$
|                                     |
$CH_3$                          $CH_3$ —$C_6H_4CH_2CH=CH_2$, —CH=$CH_2$, etc., according to the equation

The following examples illustrate the practice of the invention, and are used by way of illustration and not by way of limitation.

Example I

One hundred seventy-six (176) parts of p-xylyldichloride, 810 parts of triallyl phosphite are mixed and reacted at 110–140° C. for 5 hours, or until no more allyl chloride is liberated. The excess triallyl phosphite is removed from the reaction mixture at a reduced pressure of 10–20 mm., leaving substantially pure, viscous, almost water white

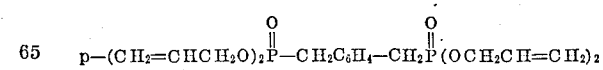

which is not distillable at 0.5 mm. up to 200° C.; but which is distilled in a molecular still to a water white product. Analysis of the product for P shows at 14.46% value which is in good agreement with the theoretical value of 14.51% P.

The use of o-xylyldichloride and m-xylyldichloride produce the corresponding isomers. When a mixture of xylyldichloride, obtained by dichloromethylating benzene according to the procedure given in Organic Reactions, I, 67 (1942), or a mixture of commercial xylyldichlorides, obtained by chlorinating a m-p mixture of xylene is used, instead of the p-xylyldichloride, then there is obtained an isomeric mixture of compounds corresponding to the formula

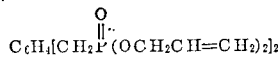

*Example II*

Four hundred fifty (450) parts of a commercial bis (chloromethyl) alkylbenzene (having an average molecular weight of 225 with a boiling point range of 170° C. to about 200° C. at 20 mm., having the alkyl groups ranging from methyl to butyl and having most of chloromethyl groups meta to each other) are treated with triallyl phosphite, as in Example I, and there is obtained a mixture of compounds corresponding to the general formula

wherein R is a mixture of $CH_3$, $C_2H_5$, $C_3H_7$, and $C_4H_9$ groups corresponding in distribution to an average molecular weight of about $C_2H_5$.

*Example III*

Example I is repeated using 800 parts of monomethyl diallyl phosphite instead of triallyl phosphite and the same compound,

is obtained in substantial yield by the elimination of methyl chloride in the reaction. When 800 parts of monoallyl-dimethyl phosphite are used instead of triallyl phosphite, there is obtained the compound

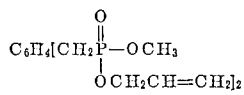

Also, when diallyl monophenyl phosphite or monomethyl, monophenylmonoallyl phosphite is used instead of triallyl phosphite, there is obtained the compound,

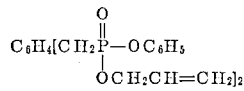

*Example IV*

Examples I and II are repeated using trimethallyl phosphite and the corresponding methallyl esters

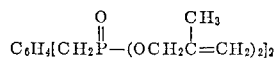

and

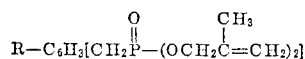

are obtained.

*Example V*

Two hundred fifty-two (252) parts of p,p'-(chloromethyl) biphenyl are reacted with 810 parts of triallyl phosphite according to the procedure of Example I, and there is obtained the compound

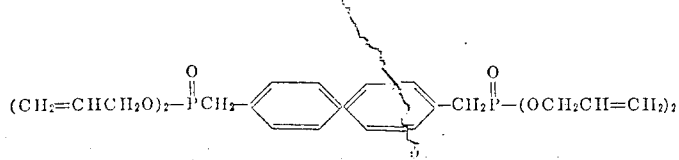

*Example VI*

Example I repeated using 312 parts of tetrachloroxylyl dichloride (prepared by chlorinating

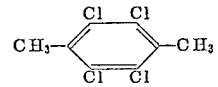

in the presence of U.V. light) instead of the xylyldichloride. There is obtained the compound

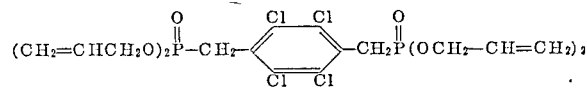

*Example VII*

Example V is repeated using 366 parts of tetra(chloromethyl)diphenyl oxide (prepared by tetra-chloromethylating diphenyl oxide according to the procedure given in Organic Reactions, I, 67 (1942)) instead of dichloromethyl biphenyl, with 1500 parts of triallyl phosphite, and there is obtained the product

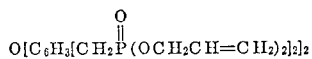

When the corresponding diphenyl amine or diphenyl sulfide is used there are obtained respectively

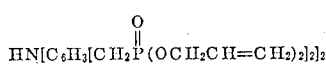

and

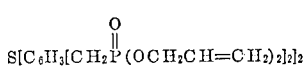

*Example VIII*

Two hundred twenty-six (226) parts of commercial grade di-chloromethyl naphthalene are reacted with 800 parts of tributenyl phosphite by the procedure of Example I, and there is obtained

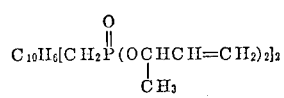

*Example IX*

The procedure of Example I is repeated, using 1000 parts of

instead of the triallyl phosphite, and there is obtained the product,

*Example X*

The commercially available compounds in the following table are converted to the bischlormethyl derivatives (by the procedure given in Organic Reactions, I, 67 (1942)), and by the procedure of Example I are converted to the corresponding phosphonium esters.

| Starting Compound | Intermediate | Monomer |
|---|---|---|
| (1) $CH_3COC_6H_5$ | $CH_3COC_6H_3(CH_2Cl)_2$ | $CH_3COC_6H_3[CH_2\overset{O}{\overset{\|}{P}}(OCH_2CH=CH_2)_2]_2$ |
| (2) $C_6H_5COOC_2H_5$ | $C_2H_5OOCC_6H_3(CH_2Cl)$ | $C_2H_5OOCC_6H_3[CH_2\overset{O}{\overset{\|}{P}}(OCH_2CH=CH_2)_2]_2$ |
| (3) $C_6H_5COOCH_2CH=CH_2$ | $CH_2=CH_2OOCC_6H_3(CH_2Cl)_2$ | $CH_2=CH-CH_2OOCC_6H_3[CH_2\overset{O}{\overset{\|}{P}}(OCH_2CH=CH_2)_2]_2$ |
| (4) $C_6H_5CON(CH_2)_2$ | $(CH_3)_2NOCC_6H_3(CH_2Cl)_2$ | $(CH_3)_2NOCC_6H_3[CH_2\overset{O}{\overset{\|}{P}}(OCH_2CH=CH_2)_2]_2$ |
| (5) $C_6H_5SO_2N(C_2H_5)_2$ | $(C_2H_5)_2NO_2SC_6H_3(CH_2Cl)_2$ | $(C_2H_5)_2NO_2SC_6H_3[CH_2\overset{O}{\overset{\|}{P}}(OCH_2CH=CH_2)_2]_2$ |
| (6) $C_7H_{15}COOC_6H_5$ | $C_7H_{15}COOC_6H_3(CH_2Cl)_2$ | $C_7H_{15}COOC_6H_3[CH_2\overset{O}{\overset{\|}{P}}(OCH_2CH=CH_2)_2]_2$ |
| (7) $O_2NC_6H_5$ | $NO_2C_6H_3(CH_2Cl)_2$ | $O_2NC_6H_3[CH_2\overset{O}{\overset{\|}{P}}(OCH_2CH=CH_2)_2]_2$ |
| (8) $C_6H_5CH_2CH_2C_6H_5$ | $ClCH_2C_6H_4CH_2CH_2C_6H_4CH_2Cl$ | $(CH_2C_6H_4)_2[CH_2\overset{O}{\overset{\|}{P}}(OCH_2CH=CH_2)_2]_2$ |
| (9) $C_6H_5CH_2CH_2C_6H_5$ | $ClCH_2C_6H_4CH_2CH_2C_6H_3(CH_2Cl)_2$ | $(CH_2=CHCH_2O)_2\overset{O}{\overset{\|}{P}}-CH_2C_6H_4CH_2CH_2C_6H_3[CH_2\overset{O}{\overset{\|}{P}}(OCH_2CH=CH_2)_2]_2$ |
| (10) $C_6H_5OC_2H_5$ | $C_2H_5OC_6H_3(CH_2Cl)_2$ | $C_2H_5OC_6H_3[CH_2\overset{O}{\overset{\|}{P}}(OCH_2CH=CH_2)_2]_2$ |
| (11) $C_6H_5CH_2OC_6H_5$ | $ClCH_2C_6H_4CH_2OC_6H_4(CH_2Cl)_2$ | $(CH_2=CHCH_2)_2O\overset{O}{\overset{\|}{P}}-CH_2C_6H_4CH_2OC_6H_4[CH_2\overset{O}{\overset{\|}{P}}(OCH_2CH=CH_2)_2]_2$ |
| (12) $C_6H_5CH_2OCH_2C_6H_5$ | $C_2CH_2C_6H_4CH_2OCH_2C_6H_4CH_2Cl$ | $O(CH_2C_6H_4)_2[CH_2\overset{O}{\overset{\|}{P}}(OCH_2CH=CH_2)_2]_2$ |

*Example XI*

The polymerization of the monomers of this invention is illustrated in the following procedure by the use of $$C_6H_4[CH_2\overset{O}{\overset{\|}{P}}(OCH_2CH=CH_2)_2]_2$$

$$CH_3-C_6H_3[CH_2\overset{O}{\overset{\|}{P}}(OCH_2CH=CH_2)_2]_2$$

$$C_2H_5-C_6Cl_3[CH_2\overset{O}{\overset{\|}{P}}(OCH_2CH=CH_2)_2]_2$$

$$C_6H_4[CH_2\overset{O}{\overset{\|}{P}}(OCH_2C=CH_2)_2]_2$$
$$\overset{|}{CH_3}$$

One hundred (100) parts of each of these monomers is independently mixed with 1 part of benzoyl peroxide and heated at 65° C. for 2 days. Insoluble, infusible polymer is obtained in each case. Other initiators such as lauroyl peroxide, tertiary butyl hydroperoxide, tertiary butyl perbenzoate, azo-bis-isobutyryl nitrile, etc., are also effective in these polymerizations. Insoluble, infusible polymers are also obtained when initiation is produced by ultraviolet light, or by ionizing radiation from Van de Graaff or linear electron or particle accelerators, or from cobalt or similar radiation sources.

If the polymerization is interrupted before gelation occurs, or is performed in the presence of an active radical chain transfer agent such as dodecyl mercaptan, chloroform, carbon tetrachloride, styrene dimer, and the like, then soluble, fusible polymers are isolated by precipitation with a nonsolvent for the polymer such as methanol, or by removal of the unpolymerized monomer from the mass under reduced pressure in the presence of an inhibitor such as dinitro-o-cresol.

*Example XII*

Copolymerization of the monomers of this invention is illustrated by the use of styrene, vinyl acetate, and methyl methacrylate monomers respectively as illustrative of the vinyl, $CH_2=CH-$, and vinylidene, $CH_2=C<$, monomers.

Ninety-five (95) parts of each of these monomers are mixed with 5 parts of $$(CH_2=CHCH_2O)_2\overset{O}{\overset{\|}{P}}-CH_2C_6H_4CH_2\overset{O}{\overset{\|}{P}}(OCH_2CH=CH_2)_2$$

and 0.6 part of bis-azo-isobutyryl nitrile and the mixture heated at 50° C. for 24 hours, 60° C. for 24 hours, and 100° C. for 36 hours. In all cases clear, insoluble, infusible polymers are obtained.

*Example XIII*

This example illustrates the copolymerization of the monomers of this invention with vinylene compounds, $-CH=CH-$, as represented by the following compounds: 144 parts of dimethyl maleate, 98 parts of maleic anhydride, 78 parts of fumaryl nitrile, and 86 parts of vinylene carbonate are each dissolved independently in 500 parts of $$(CH_2=CHCH_2O)_2\overset{O}{\overset{\|}{P}}-CH_2C_6H_4CH_2\overset{O}{\overset{\|}{P}}(OCH_2CH=CH_2)_2$$

containing 5 parts of tertiary butyl perbenzoate and heated according to the schedule of Example XII and insoluble, infusible copolymers are obtained. The copolymer with maleic anhydride exhibits ion exchange properties. Ion exchange resins of higher capacity are prepared by polymerizing 90–95 parts of acrylic acid, or 90–95 parts of itaconic anhydride, or 90–95 parts of vinyl benzene sodium sulfonate with 5–10 parts of the phosphonium monomer of this example.

*Example XIV*

The crosslinking grafting of polymers by the monomers of this invention can be conducted by the following procedure. Sixty (60) parts of very finely divided polyvinyl chloride are mixed with 40 parts of the mixed monomers of Example IX. In the resulting mixture is dissolved 0.5 part of benzoyl peroxide, and the mixture ballmilled to uniformity. The mixture is then molded at 135° C. at 600 p.s.i. for 10 minutes; and an insoluble, infusible copolymer of polyvinyl chloride and the phosphonium monomer is obtained. This crosslinking effect is observable even when small amounts of monomer of the order of 1–10 percent are used. Also, the standard plasticizers and stabilizers for polyvinyl chloride may be present in the compositions. Other polymers such as the copolymers of vinyl chloride with vinyl acetate, polymethyl methacrylate, cellulose acetate, etc., may be used instead of polyvinyl chloride.

*Example XV*

The polyvinyl chloride-monomer mixture of Example XIV, but not containing initiator, is extruded into a 10-mil film and subjected to a 10 megarad dose of irradiation with a Van de Graaff linear accelerator. A film of crosslinked copolymer is obtained.

*Example XVI*

Forty (40) parts of a commercial sample of polyester of the α,β unsaturated dicarboxylic acid type, which, in this case, is a phthalic acid-modified glycol maleate, is mixed with 60 parts of

containing 0.5 part of tertiary butyl hydroperoxide and a small amount of cobalt activator (0.01 part). The resultant mixture is allowed to stand at room temperature for 4 hours, and then heated at 50° C. for 4 hours, 60° C. for 8 hours, and 80° C. for 10 hours. A hard, insoluble, infusible crosslinked polymer is obtained. Molded compounds and laminated products are obtained from these compositions by the use of fillers, both organic and inorganic, such as clays, ground glass, woven glass fabrics or glass mats.

*Example XVII*

Example I is repeated using 800 parts of dimethylmonallyl phosphite and there is obtained

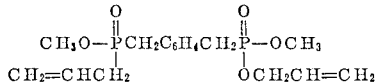

which is polymerized readily by the procedure of Example XI.

*Example XVIII*

One hundred seven (107) parts of

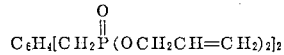

and 29 parts of allyl amine are mixed and heated to 50° C. for 4 hours and by-product allyl alcohol removed at 10 mm. leaving the product

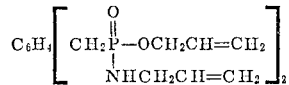

When other amines such as ethanol amine, butylamine, aniline, chloroaniline, cyclohexyl, and benzyl amine are used instead of allyl amine, then the corresponding amides are obtained, all of which are readily polymerized by the procedure of Example XI.

*Example XIX*

Two hundred thirteen (213) parts of

and 800 parts of methanol containing 40 parts of NaOH are refluxed for 1 hour following which the excess methanol is removed under 15 mm. pressure. The residue is washed with heptane and dried in a vacuum chamber. The product corresponds to the formula

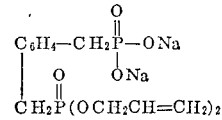

which may have also the structure

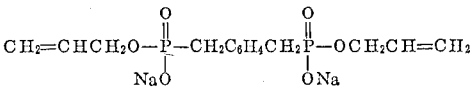

The monomer is soluble in water, and when initiated with potassium persulfate or other water soluble initiators, yields a water-insoluble aqueous gel.

When KOH, LiOH, or other alkalies or alkaline earth hydroxides are used for the hydrolysis, the corresponding K, Li, Ca, Mg, Sr, etc. salts are obtained. Other metal derivatives such as iron, copper, nickel, chromium, zirconium, etc., are readily prepared by metathesis of the sodium, potassium, or lithium salts with the appropriate salt and likewise heavy metal derivatives are similarly prepared with appropriate salts, such as zinc chloride, copper chloride, vanadium sulfate, etc. When a polyvalent metal is used, the second or other additional valencies can be occupied by OH, halide, sulfate, phosphate, etc., or both or all valencies can be attached to the phosphonium moiety.

The water soluble salts are useful for the preparation of ion exchange resins per se, or for impregnating porous structures for ion exchange resin use, such as refractory materials to produce ion exchange beds or membranes, etc. These soluble monomers are also useful for impregnating other porous substances for other uses, such as paper, wood, leather, and the like, to produce mold resistant products, improved flame resistance as well as for tanning.

A 20 percent aqueous solution of the sodium salt of Example XIX containing one percent ammonium persulfate based on the monomer content is used to impregnate soft pine until at least seven percent of the monomer is retained in the wood, and the impregnated product dried at room temperature for 48 hours, then at 50° C. for 24 hours, and at 75–80° C. for 24 hours. An insoluble polymer is formed in situ in the wood. The wood is then immersed in a five percent cupric chloride aqueous solution for 72 hours, removed, washed with water and dried. On analysis the wood is found to contain substantial quantities of bound copper which is not readily extracted by water. The treated board shows excellent resistance to wood destroying fungi and has greater fire resistance than untreated wood.

In a similar way, untanned leather is treated with the sodium salt of the monomer, the monomer polymerized in situ, and the sodium ions exchanged for zirconium, zinc, and chromium ions to produce well tanned leathers.

The free acid of these monomers is readily prepared by treating the sodium, potassium, etc. salts with inorganic acids such as sulfuric or phosphoric acids; and the ammonium and amine salts are readily prepared from the free acid by the addition of gaseous or liquid, or aqueous, or alcoholic, or other solution of ammonia or amines to the acids. A few typical examples of appropriate amines are methyl amine, ethyl amine, tributyl amine, ethanol amine, diethanol amine, triisopropyl amine, cyclohexyl amine, di-octadecyl amine, aniline, pyridine, etc. These ammonium and amine salts of the monomers are used in a fashion similar to the alkali and alkaline earth salts.

The monomers of this invention are chemical compounds which can also be used as chemical intermediates for the preparation of new compounds which have utility other than in the preparation of polymers. As an example, these monomeric compounds can be halogenated to produce the chloro- or bromo-derivatives as illustrated by the reaction

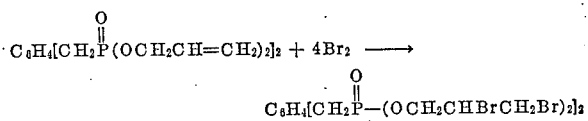

which reaction is applicable generally to all of the compounds of the structure, $Ar(A)_n$, and these derivatives have great utility as gasoline additives and flame extinguishing additives for paper, cloth, wood, polymers such as polystyrene, etc. Furthermore, these monomers can be epoxidized with $H_2O_2$ and an acid or cation exchange resin, or with $(CH_3CO)_2O_2$ as illustrated by

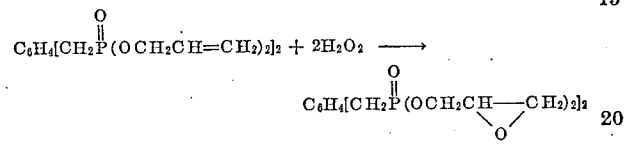

which reaction is applicable broadly to the compounds of the structure $Ar(A)_n$; these derivatives have great utility as stabilizers for polymers, as hydrohalide acceptors, as intermediates in the preparation of adhesives for metals, wood and other substances, for the preparation of varnishes, paints, etc.

The invention claimed is:
1. A compound of the formula

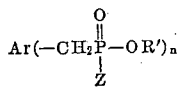

wherein
$n$ is an integer having a value of at least 2 and no more than 6,
R' represents an unsaturated hydrocarbon radical having a $CH_2=C<$ group and at least 2 and no more than 12 carbon atoms,
Z is a radical selected from the class consisting of OR, OM, and $NR_2$ wherein M represents a radical selected from the class consisting of ammonium, K, Li, Ca, Mg, Sr, Fe, Cu, Ni, Cr, Zr, Zn and V radicals, and R represents a hydrocarbon radical having no more than 20 carbon atoms,
Ar is a polyvalent aromatic group selected from the class consisting of phenylene, naphthylene, diphenylene, terphenylene, diphenylene-ethane, diphenylene-ethene, diphenylene oxide and diphenylene amine, said aromatic groups thereof each having no more than 30 carbon atoms therein.

2. A compound of the formula

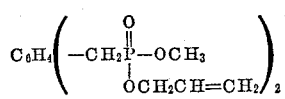

3. A compound of the formula

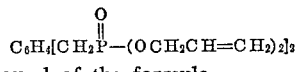

4. A compound of the formula

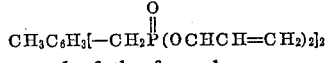

5. A compound of the formula $$C_{10}H_6[-CH_2\overset{O}{\overset{\|}{P}}(OCH_2CH=CH_2)_2]_2$$

6. A compound of the formula

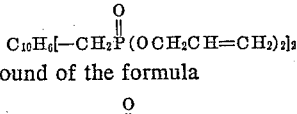

7. A compound of the formula

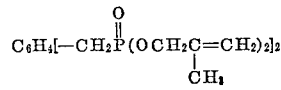

8. A compound of the formula

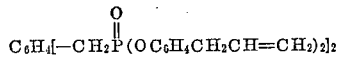

References Cited by the Examiner
UNITED STATES PATENTS

| | | | |
|---|---|---|---|
| 2,848,475 | 8/1958 | Schmidt | 260—461 |
| 3,029,271 | 4/1962 | Birum et al. | 260—461 |
| 3,059,017 | 10/1962 | Dever et al. | 260—461 |
| 3,105,064 | 9/1963 | Kramer et al. | 260—80 |
| 3,142,663 | 7/1964 | Niebergall | 260—80 |

FOREIGN PATENTS 1,108,220  6/1961  Germany.

FOREIGN PATENTS

Arbuzov et al., "J. Gen. Chem., U.S.S.R.," vol. 20, 1950, pp. 1297–1299.

CHARLES B. PARKER, *Primary Examiner.*

MORRIS LIEBMAN, JOSEPH L. SCHOFER,
*Examiners.*